Feb. 11, 1941. W. E. McCORQUODALE, JR., ET AL  2,231,544
METHOD OF BREAKING FOAM
Filed June 16, 1938
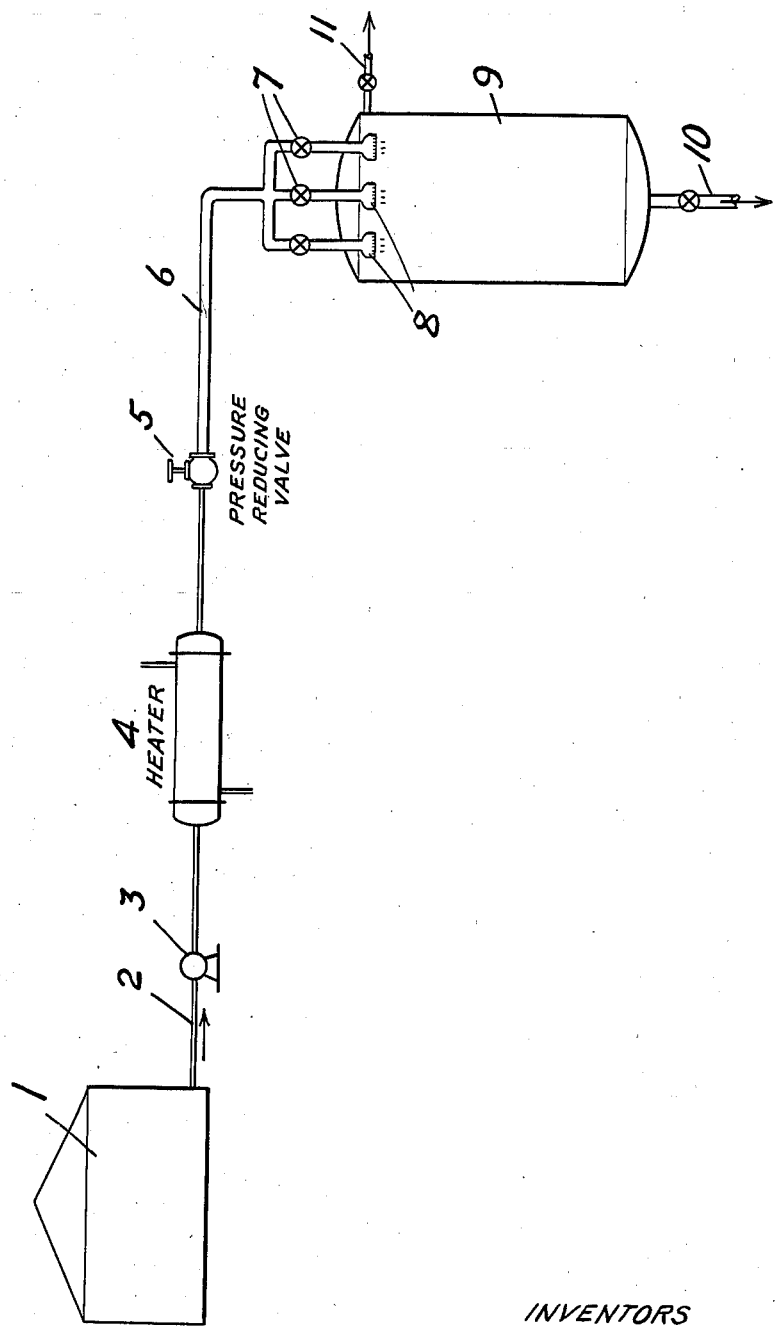
INVENTORS
Wilmer E. McCorquodale Jr.
and Charles H. Brooks
BY
Busser and Harding
ATTORNEYS Patented Feb. 11, 1941

2,231,544

UNITED STATES PATENT OFFICE 2,231,544

METHOD OF BREAKING FOAM

Wilmer E. McCorquodale, Jr., Ardentown, Del., and Charles H. Brooks, Swarthmore, Pa., assignors to Sun Oil Company, Philadelphia, Pa., a corporation of New Jersey Application June 16, 1938, Serial No. 214,144

6 Claims. (Cl. 252—321)

In the refining of petroleum, emulsions of water in heavy oil or asphalt are very often formed which are extremely difficult to break, and will not separate on standing. Such emulsions are most difficult to break when there is present in the oil or asphalt, as the case may be, even a small percentage of protective materials, such as so-called petroleum acids, as these acids, or their soaps if the oil has been treated with an alkali, tend to cause the water and oil to form extremely stable emulsions.

Such emulsions cannot be broken by merely heating the emulsions sufficiently to vaporize the water since when this is attempted, the vaporization of the water causes the formation of foam which can be broken down only with great difficulty. Therefore various other procedures for dehydrating such emulsions have heretofore been proposed, among which may be mentioned the method of heating such emulsions under a pressure sufficient to prevent vaporization of the water and then permitting the water and oil of such a heated emulsion to separate while under pressure, it having been found that heat and pressure will effect a break of the emulsion or a separation of the component parts thereof from each other. Such a procedure has to usually be carried out as a batch process although attempts have been made to carry it out continuously, but in such cases extremely large settling tanks are necessary and their control is difficult. The use of a pressure sufficiently high to prevent vaporization of the water is an essential feature of such a process since, if such pressure is not employed, the vaporization of water which results causes the formation of foam which prevents the separation of the component parts of the emulsion and also practically prevents further heating of the emulsion.

We have discovered that such foam can easily be broken and that such emulsions can be broken in a continuous manner so as to substantially completely dehydrate the oil or asphalt.

In carrying out the present invention, the emulsion is heated to a temperature above the boiling point of water, but is maintained during heating under a pressure sufficiently high to prevent vaporization of the water. After the emulsion has been heated sufficiently, it is expanded into a zone at a pressure above the final pressure, but sufficiently below the initial heating pressure to permit all of the water to be vaporized. This expansion causes the formation of foam which is broken down only very slowly merely by permitting it to stand. We have found that if the foam thus formed is then expanded under the conditions hereinafter set forth through an orifice sufficiently small to completely break up the foam, it readily separates into its component parts, oil and steam.

In the initial heating step sufficient heat is preferably supplied to the emulsion, in the form of specific heat, to furnish the latent heat of vaporization necessary to evaporate all of the water present on the first expansion step, since, if this is not followed out and any water is left in the foam, it is apparent that on further expansion through the orifice, the water unvaporized in the first pressure reduction step may be vaporized by the further drop in pressure through the orifice, and prevent the breaking up of the foam. It is also highly desirable during the initial heating step that the emulsion be maintained under sufficient pressure to prevent vaporization of any of the water present since, although the foam which may be formed by the vaporization of the water is broken by expansion through the orifice as above set forth, the formation of foam during the heating step renders further heating of the emulsion very difficult. This is true since an emulsion containing a substantial amount of foam absorbs heat only very slowly.

It is, therefore, an object of the present invention to provide a method of breaking foam.

A further object of the invention is to provide a method for dehydrating solutions of viscous liquids which tend to form foam.

For a better understanding of the invention, reference should be made to the accompanying drawing the single figure of which is a diagrammatic flow chart of apparatus suitable for practicing the invention.

The emulsion which it is desired to break or dehydrate is stored in a tank 1 and is removed therefrom through line 2 by pump 3 and forced under sufficient pressure to prevent vaporization through a heater 4, wherein it is heated to the desired degree. The heated emulsion from the heater 4 passes through a pressure reducing valve 5 into an enlarged conduit or vaporizing zone 6 the pressure being reduced sufficiently in the zone 6 to permit the water contained therein to vaporize. The vaporization of the water causes the formation of foam in the zone 6 which flows to the spray heads or orifice plates 8 in tank 9. Each spray head or orifice plate 8 is provided with a number of small orifices through which the foam passes, a pressure differential of 2 to 14 lbs. per square inch being maintained between expansion zone 6 and the tank 9 the rate of flow and consequent pressure drop across the orifices being controlled by using only a sufficient number of the spray heads to give the desired pressure differential any unnecessary spray heads being shut off by closing the valves 7 in the lines leading to the individual spray heads. On passing through the orifices in spray heads 8 the foam is broken up into its component parts, the liquid material falling to the bottom of tank 9 and being removed therefrom through valved line 11. As a general rule, the pressure maintained in tank 9 is atmospheric pressure though, if desired, a higher pressure may be maintained therein with a correspondingly higher pressure being maintained in expansion zone 6.

As a specific example, asphaltic still bottoms containing dissolved and/or suspended water from tank 1 were heated in heater 4 to a temperature of about 365° F. under a pressure of 175 pounds per square inch. The heated still bottoms were then passed through a pressure release valve 5 into expansion zone 6 and the pressure thereon reduced to between 2—14 pounds per square inch above atmospheric pressure. This reduction in pressure permitted all the water remaining in the still bottoms to vaporize. The steam, however, broke up the still bottoms and formed with them a finely divided foam which was not readily broken down merely by permitting it to stand, due to the surface tension of the still bottoms and the fact that on cooling they became substantially solid. This foam, still in a heated condition, was then expanded through the orifices in orifice plate 8 into tank 9 and the pressure dropped to substantially atmospheric pressure, the expansion through the orifices causing the minute bubbles forming the foam to break up and separate into steam and liquid dehydrated still bottoms. It has been found that for heavy oils, with the drop in pressure of from 2–14 pounds per square inch across the orifices, an orifice not larger than ¼″ is required. These conditions were found to be particularly suitable where oil mixtures containing from 1.6–3.7 per cent of water were treated.

It is to be understood that the apparatus and specific example just described are illustrative only of the invention and that various changes and modifications may be made therein without departing from the scope of the invention. For instance it frequently happens that the emulsion to be dehydrated is produced in some refining process from which it is obtained under a high pressure and in an already heated condition so that it contains sufficient heat to vaporize all of its contained water. If such is the case, further heating in the present process is unnecessary, the heating and pressure producing means of such process in which the heated emulsion is produced being considered as the equivalents of the pump 3 and heater 4 heretofore described, and the heated emulsion from such process under sufficient pressure to prevent vaporization of its contained water may flow directly from such process to the pressure reducing valve 5 and be expanded therethrough into the zone 6 in the manner heretofore described.

From the following it will be observed that certain conditions of pressure drop and size of the orifice are required for satisfactory foam breaking, and that departure from these conditions prevents accomplishing the result sought.

| Test No. | Diam. of orifice in inches | Pressure drop across orifice, lbs./sq. in. | Observations |
|---|---|---|---|
| A | ¼ | 1.7 | Some very fine foam. |
| B | ¼ | 2.3 | Very little foam. |
| C | 7/32 | 1.8 | Less than A. |
| D | 7/32 | 2.5 | No foam. |
| E | 3/16 | 1.9 | Less than A. |
| F | 3/16 | 3.0 | No foam. |
| G | 5/32 | 2.7 | Do. |
| H | 5/32 | 6.5 | Do. |
| I | 5/32 | 19.5 | Coarse foam. |

From the foregoing description and examples, it will be apparent that too great a pressure drop across the orifice does not effect any material breaking of the foam, and that too low a pressure drop likewise has little effect on the foam, the critical range of pressure drop being apparently between 2 to 14 pounds per square inch. The size of the orifice across which the foam is expanded may be varied in reasonably wide limits. For materials of the nature of asphalt, it has been found that the orifice should preferably be between 1/8 and ¼ inch in diameter, although orifices beyond these limits have been used with satisfactory results on such materials. With other materials of different viscosity and surface tension other sizes may be optimum. It is also desirable that the orifices be not spaced too closely together in the orifice plates, a spacing of twice the diameter of the orifices being preferably used.

While the invention has been described in connection with its use in dehydrating emulsions of heavy hydrocarbon oils such as asphalt, it is to be understood that it is equally applicable to the dehydrating of other viscous liquids having a tendency to form foam on heating. It is also to be understood that the principles of the present invention may be used for breaking foam regardless of how the foam is formed.

For example in various solvent refining processes in which a relatively viscous liquid is treated with a relatively volatile solvent and the raffinate or extract is then heated to vaporize the solvent, there is frequently a tendency to form foam. Such mixtures of volatile solvents and viscous liquids, having a tendency to form foam on heating, may be considered as the equivalents of the emulsion of water and asphalt heretofore described and the principles of the present invention may be used in separating them.

Having now described our invention what we claim and desire to protect by Letters Patent is:

1. A method of removing a relatively volatile liquid from a mixture of such volatile liquid and a viscous liquid, having a tendency to foam on heating, which comprises flowing the mixture through three zones in which it is under progressively decreasing pressures, subjecting the mixture in the first zone to a temperature sufficiently above the boiling point of the volatile liquid in the second zone to effect its substantially complete vaporization in the second zone but under a pressure sufficiently high to prevent such vaporization in the first zone, expanding the mixture into the second intermediate pressure zone at a pressure sufficiently below the pressure in the heating zone to cause substantially all said volatile liquid to vaporize and form with the viscous liquid a foam, and then expanding the foam through one or more small orifices into the third lowest pressure zone to thereby break the foam into its component parts, the vapors of the volatile liquid therein separating from the viscous liquid.

2. A method of removing a relatively volatile liquid from a mixture of such volatile liquid and a viscous liquid, having a tendency to foam on heating, which comprises flowing the mixture through three zones in which it is under progressively decreasing pressures, subjecting the mixture in the first zone to a temperature sufficiently above the boiling point of the volatile liquid in the second zone to effect its substantially complete vaporization in the second zone but under a pressure sufficiently high to prevent such vaporization in the first zone, expanding the mixture into the second intermediate pressure zone at a pressure sufficiently below the pressure in the heating zone to cause substantially all said volatile liquid to vaporize and form with the viscous liquid a foam, and then expanding the foam through a number of small orifices into the third lowest pressure zone to thereby break the foam into its component parts, and varying the number of such orifices to thereby variably predetermine the pressure drop between the second and third zones.

3. The method set forth in claim 1 in which the pressure drop between the first and second zones is multiple times that between the second and third zones.

4. The method set forth in claim 1 in which the pressure drop between the first and second zones is multiple times that between the second and third zones and in which the pressure drop between the second and third zones is not less than two pounds to the square inch but not more than about one atmosphere.

5. The process set forth in claim 1 in which the viscous liquid is asphalt and the relatively volatile liquid is water.

6. The method set forth in claim 1 in which the pressure drop between the first and second zones is multiple times that between the second and third zones and in which the viscous liquid is asphalt and the relatively volatile liquid water.

WILMER E. McCORQUODALE, Jr.
CHARLES H. BROOKS.